United States Patent
Glaser

[19]

[11] Patent Number: 6,062,781
[45] Date of Patent: May 16, 2000

[54] LOAD SECURITY SYSTEM FOR A STORAGE AND TRANSPORT FRAMEWORK FOR STORING AND/OR TRANSPORTING TWO-DIMENSIONAL ARTICLES

[76] Inventor: Siegfried Glaser, Am Kapellenberg 53, D-37688 Beverungen, Germany

[21] Appl. No.: 09/012,032

[22] Filed: Jan. 22, 1998

[30] Foreign Application Priority Data

Jan. 23, 1997 [DE] Germany ............... 297 01 147 U

[51] Int. Cl.⁷ ................................. B61D 45/00
[52] U.S. Cl. ................. 410/100; 410/103; 410/94; 410/46; 410/35
[58] Field of Search ................. 410/100, 96, 97, 410/103, 94, 46, 34, 35; 108/55.1, 55.5; 248/499; 24/265 CD, 68 CD

[56] References Cited

U.S. PATENT DOCUMENTS

| | | | |
|---|---|---|---|
| 2,442,557 | 6/1948 | Cox | 410/96 |
| 3,409,157 | 11/1968 | Lull | 410/100 |
| 3,863,799 | 2/1975 | Thomaswick et al. | 410/97 |
| 3,878,942 | 4/1975 | Hansen et al. | 410/34 |
| 3,955,676 | 5/1976 | Hansen et al. | 410/46 |
| 3,957,285 | 5/1976 | Schlaeger | 410/100 |
| 4,111,132 | 9/1978 | Plut | 410/97 |
| 4,314,783 | 2/1982 | Parnell et al. | 410/100 |
| 4,385,856 | 5/1983 | O'Neal | 410/34 |
| 4,770,577 | 9/1988 | Farris | 410/96 |
| 4,801,228 | 1/1989 | Van Gompel | 410/94 |
| 4,964,771 | 10/1990 | Callihan | 410/103 |
| 5,076,745 | 12/1991 | Klein | 410/94 |
| 5,288,187 | 2/1994 | Ward | 410/100 |
| 5,564,723 | 10/1996 | Breeden et al. | 410/97 |

FOREIGN PATENT DOCUMENTS

| | | |
|---|---|---|
| 79 04 264 U1 | 10/1979 | Germany . |
| 29 10 715 A1 | 9/1980 | Germany . |
| 35 16 914 C2 | 12/1987 | Germany . |
| 41 27 371 A1 | 2/1993 | Germany . |
| 195 08 955 A1 | 9/1996 | Germany . |
| 1196-311 | 12/1985 | U.S.S.R. ............ 410/34 |

*Primary Examiner*—Douglas Hess
*Attorney, Agent, or Firm*—Lane, Aitken & McCann, L.L.P.

[57] ABSTRACT

A load security system for a storage and transport framework for storing and/or transporting two-dimensional articles comprises an abutment element for engaging one side edge of the two-dimensional articles, a spring or pivoted element for engaging an opposite side edge of the two-dimensional articles, and a tensioning device connected between the spring or pivoted element and a framework supporting the two-dimensional articles so that the spring or pivoted element exerts pressure on the surface of the two-dimensional articles for flat pressure thereof onto the framework and, simultaneously, exerts pressure on the side edges of the two-dimensional articles in a direction toward the abutment element.

22 Claims, 6 Drawing Sheets

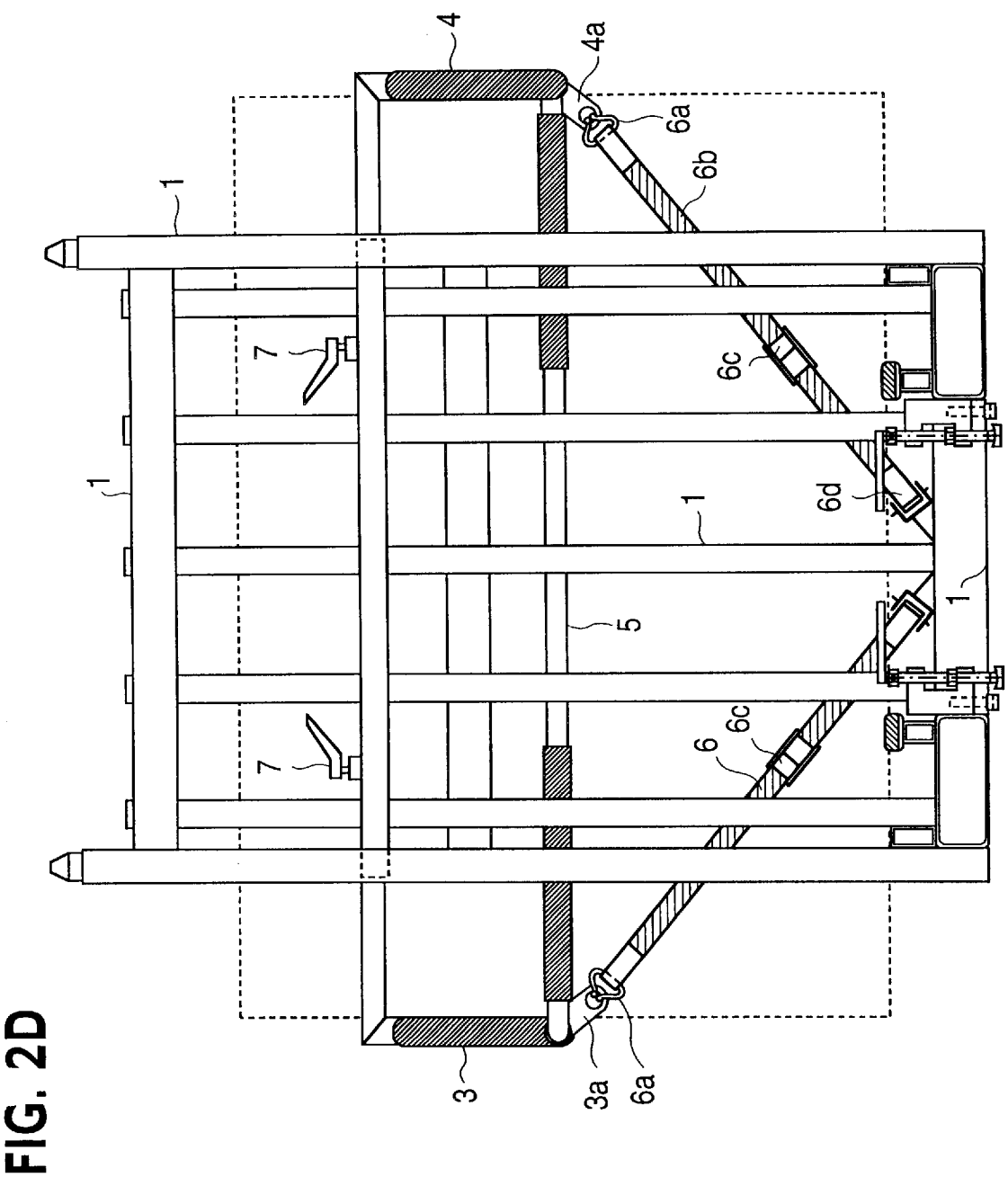

FIG. 3A
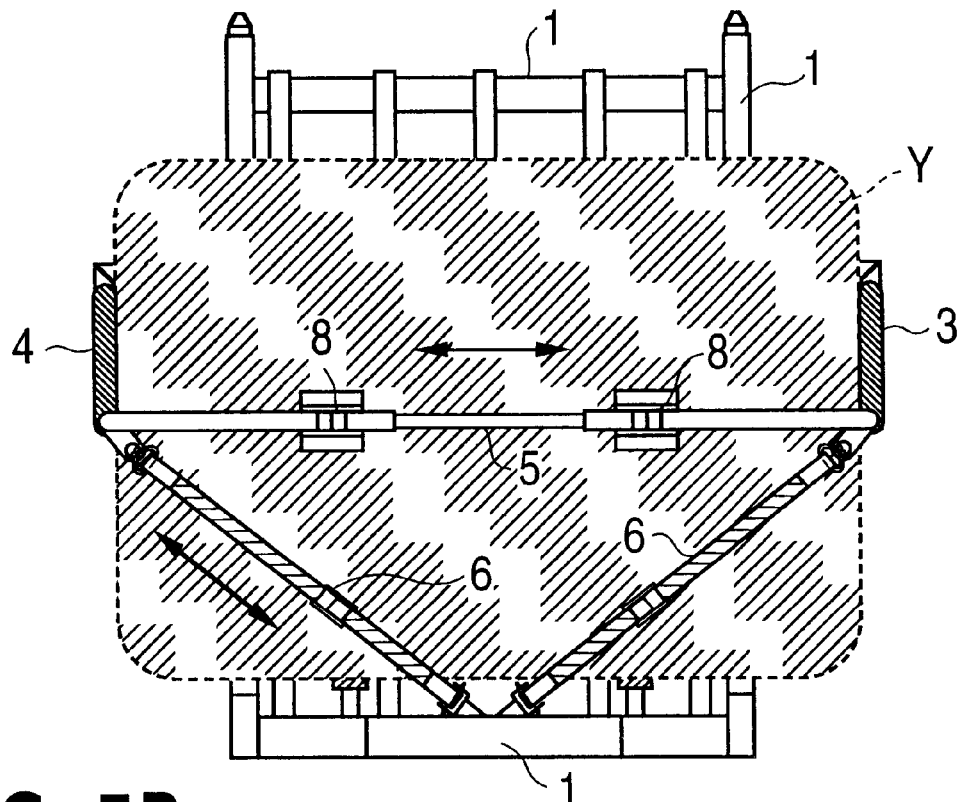
FIG. 3B
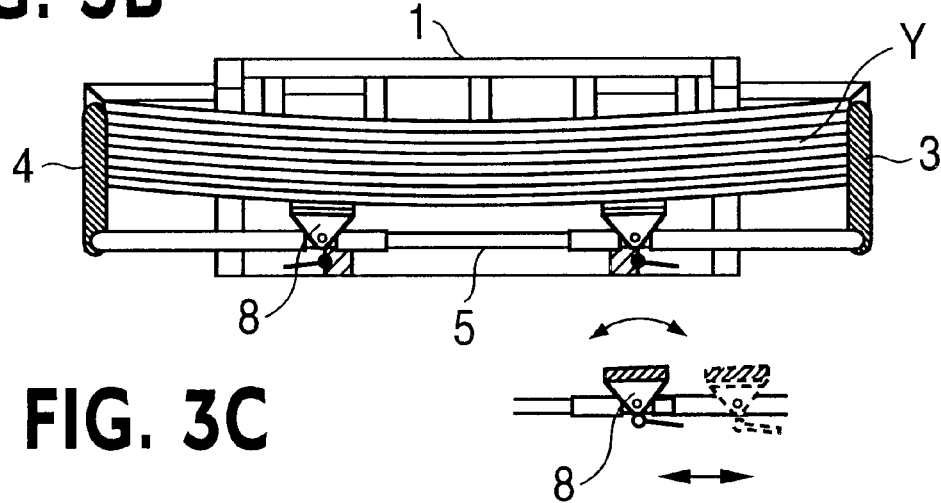
FIG. 3C

LOAD SECURITY SYSTEM FOR A STORAGE AND TRANSPORT FRAMEWORK FOR STORING AND/OR TRANSPORTING TWO-DIMENSIONAL ARTICLES

The present invention relates to a load security system for a storage and transport framework for storing and/or transporting two-dimensional articles, with at least one frame part against which the two-dimensional articles lean and with at least one support fitted in its lower region for the lower edges of the two-dimensional articles, which comprises a load security device with an abutment element for a side edge of the two-dimensional articles.

The present invention concerns in particular a load security system for two-dimensional articles to be stored and/or transported vertically, such a glass plate packs, glass plates, plastics sheets and sheets of metal for example, which are stored and transported on suitable storage and transport frameworks.

Load security systems of the kind initially referred to are already known from the state of the art, comprising a load security device with an abutment element for one side edge of the two-dimensional articles, wherein known stop elements are implemented for example as a rigid U-frame fitted on one side of the transport framework (FIG. 4A) or as a pivoted swinging U-frame fitted on one side of the transport framework (FIG. 4B), in order to facilitate secure transport of glass plate packs for example. Security of a glass plate pack on a transport framework is possible (FIG. 4C) simply by securing with tightening and lashing devices in the form of straps.

A disadvantage of the conventional load security systems for glass plate packs is that either the glass plate pack is not secured in all possible directions in which inertial forces can occur during transport (FIGS. 4A and 4B), which involves the danger of damage to the glass plates and the danger of an accident, or such a securing of the glass plate pack is indeed achieved (FIG. 4C) but with relatively complex working procedures and a relatively high expenditure of working time in fitting the securement.

The object of the present invention therefore consists in providing a load security system for a storage and transport framework for storing and/or transporting two-dimensional articles, which facilitates improved securing of two-dimensional articles during storage and/or transport, at the same time with as rapid and simple working procedures for the securing as possible.

This object is met by the load security system for a storage and transport framework for storing and/or transporting two-dimensional articles wherein a load security device comprises a spring or pivoted element on or in the vicinity of one side edge of two-dimensional articles, which by means of a tensioning device exerts pressure on the surface of the two-dimensional articles for flat pressure thereof onto the respective frame part of the storage and transport framework with the features of the characterizing part of claim 1.

In particular, in a load security system for a storage and transport framework for storing and/or transporting two-dimensional articles, with at least one frame part against which the two-dimensional articles lean and with at least one support fitted in its lower region for the lower edges of the two-dimensional articles, which comprises a load security device with an abutment element for a side edge of the two-dimensional articles, this object is met in that the load security device comprises a spring or pivoted element on or in the vicinity of the other side edge of the two-dimensional articles, which by means of a tensioning device exerts pressure of the surface of the two-dimensional articles for flat pressure thereof on to the respective frame part of the storage and transport framework.

An advantage with the present invention is that optimum two-dimensional load security is obtained through the combination of spring or pivoted elements fitted at the side with tensioning devices, such as lashing devices for example, which is nevertheless simple and rapid to fit and remove again. This avoids both the risk of an accident, possible damage to the material and concomitant economic losses, arising from inadequate securing; working time which was previously necessary for complete security is also saved.

Advantageous developments of the invention are characterized in the dependent claims.

Thus different load depths can easily be compensated by a pivoted load securement.

Both load heights and load lengths can be matched optimally by telescopic devices.

Load lengths can be pre-adjusted by locking devices on the rear side of the framework and the load can be additionally horizontally secured.

There is no lateral sliding of the load because of the two-dimensional load securement.

Embodiments of the invention will be explained in more detail below with reference to the drawings, in which:

FIG. 2D shows the second preferred embodiment of the load security system according to the invention of FIG. 2A in the empty state in a view from the rear side of the transport framework;

FIG. 3A shows a third preferred embodiment of the load security system according to the invention in the loaded state in a view from the front;

FIG. 3B shows the third preferred embodiment of the load security system according to the invention of FIG. 3A in the loaded state in a view from above;

FIG. 3C is a detail view from above of an abutment element of the third preferred embodiment of the load security system according to the invention;

Figure 1B:
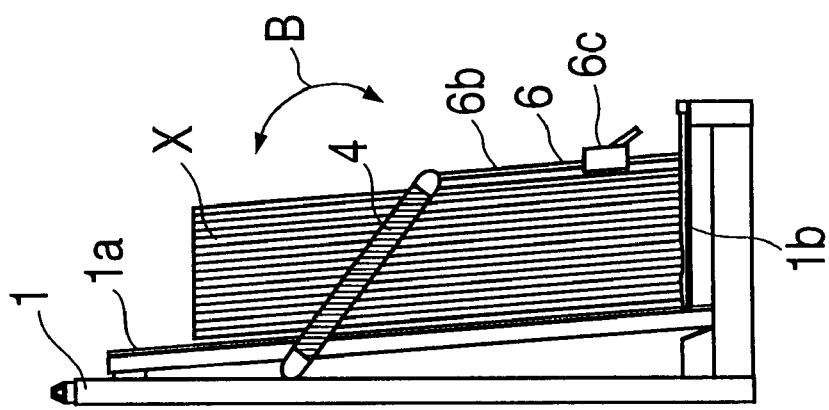
FIG. 1B shows the first preferred embodiment of the load security system according to the invention of FIG. 1A in the loaded state, from the side.
Figure 1A:
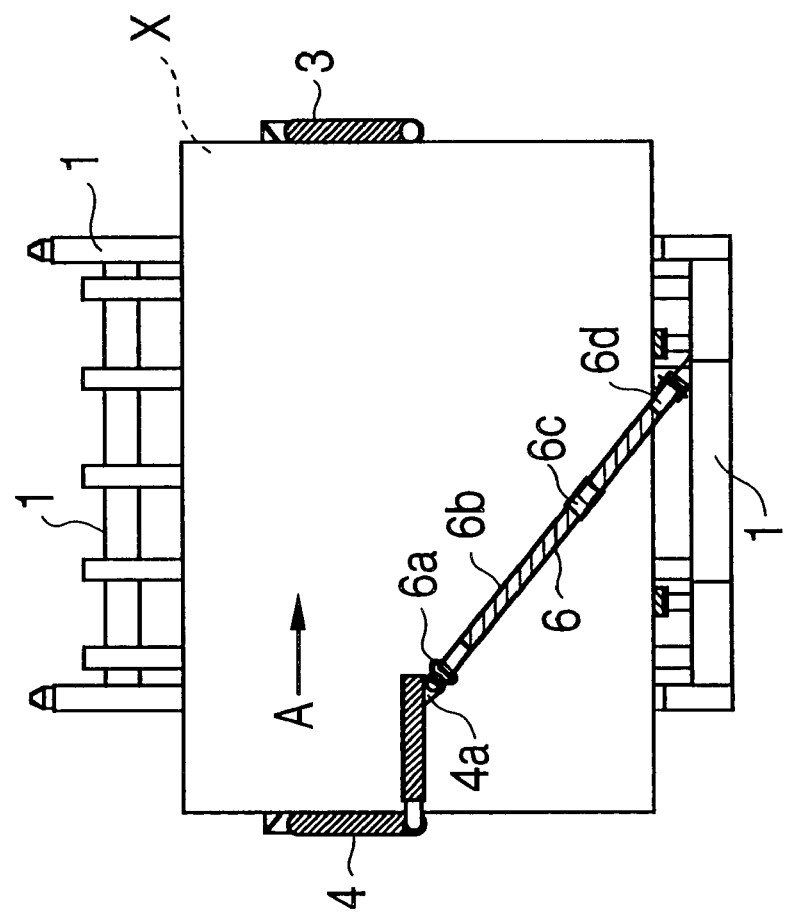
FIG. 1A shows a first preferred embodiment of the load security system according to the invention in the loaded state, in a view from the front.

FIGS. 1A and 1B show a first preferred embodiment of the load security system according to the invention in the loaded state, in a view from the front and a view from the side respectively. A storage and transport framework 1 is shown in FIGS. 1A and 1B, for the storage and/or transport of two-dimensional articles X. It comprises a frame part 1*a* against which the two-dimensional articles X lean. The frame part 1*a* against which the two-dimensional articles X lean is normally canted at an angle of about 4° relative to the vertical part of the storage and transport framework 1, in order to avoid the two-dimensional articles X tipping over during loading and unloading. A support 1*b* for supporting the lower edges of the two-dimensional articles is fitted in the lower region of the frame part 1*a*. The load security device comprises an abutment element 3 for supporting one side edge of the two-dimensional articles X and a spring or pivoted element 4 on or in the vicinity of the other side edge of the two-dimensional articles X, being in the form of pivoting swing U-frame element 4. This swinging U-frame element 4 can pivot about and slide horizontally on a horizontal axis. For loading and unloading it is in each case swung up and then matched optimally to the load depth and load length by sliding sideways and swinging down in accordance with the load depth and load length. Thereafter the swinging U-frame element 4 is fixed to the front side of the storage and transport framework 1 by a tensioning device 6, which is in the form of a flexible lashing device 6.

The flexible lashing device 6 (visible enlarged in FIG. 2D) comprises a hook element 6*a* for hooking into an eye 4*a* on the end point of the swinging U-frame element 4, through which rapid fixing and rapid release of the swinging U-frame element 4 is possible. To this end the flexible lashing device 6 also comprises regions of strip-form elastic material 6*b*, an adjusting device 6*c* for the band length, which can be fixed, and a retaining element 6*d* with which it is fixed to the storage and transport framework 1. The attachment to the storage and transport framework 1 is effected in a special diagonal arrangement relative to the side edges of the two-dimensional articles X which allows the flexible lashing device 6 to exert pressure on the surface of the two-dimensional articles X so as to press them flat against the frame part 1*a* of the storage and transport framework 1, which is symbolised by the arrow B in FIG. 1B, and simultaneously to apply pressure to the side edges of the two-dimensional articles X for sideways pressure on to the abutment element 3, in order to prevent sideways slipping of the load, which is symbolised by the arrow A in FIG. 1A. The securing of the load is effected after the swinging U-frame element 4 has been swung down and matched optimally to the load length and load depth, in that the hook element 6*a* of the flexible lashing device 6 is hooked into the eye 4*a* of the swinging U-frame element 4. The applied pressure can then be regulated and set to the desired value by moving the adjusting device 6*c* for the band length.

FIGS. 2A to 2G are views of a second preferred embodiment of the load security system according to the invention. A storage and transport framework 1 is shown in the Figures and serves for storing and/or transport of two-dimensional articles X. It comprises a frame part 1*a*, against which the two-dimensional articles X lean. The frame part 1*a* against which the two-dimensional articles X lean is normally canted at an angle of about 4° relative to the vertical part of the storage and transport framework 1, in order to avoid the two-dimensional articles X tipping over during loading and unloading. A support 1*b* for supporting the lower edges of the two-dimensional articles is fitted in the lower region of the frame part 1*a*. The load security device comprises an abutment element 3 for supporting one side edge of the two-dimensional articles X, which element is in the form of a slidable swinging U-frame element 3 pivoting about and sliding horizontally along a horizontal axis and a spring or pivoted swinging element 4 on or in the vicinity of the other side edge of the two-dimensional articles X, also formed as a pivoted swinging U-frame element 4, which can pivot about and slide horizontally along a horizontal axis. The two swinging U-frame elements 3, 4 are connected together by a telescopic device 5, which can telescope on the front and rear sides of the storage and transport framework 1 in the direction of the axis of the swinging U-frame elements 3, 4. During loading and unloading the two telescopically connected swinging U-frame element 3, 4 are swung up, so that unimpeded loading and unloading is possible. Thereafter they are pushed apart or together in accordance with the load length and swung down in accordance with the load depth, so that the two swinging U-frame elements 3, 4 are matched in this way optimally to the load depth and load length. Then the two swinging U-frame elements 3, 4 are fixed to the front side of the storage and transport framework 1 by tensioning devices 6, which are formed as flexible lashing devices 6.

Figure 2C:
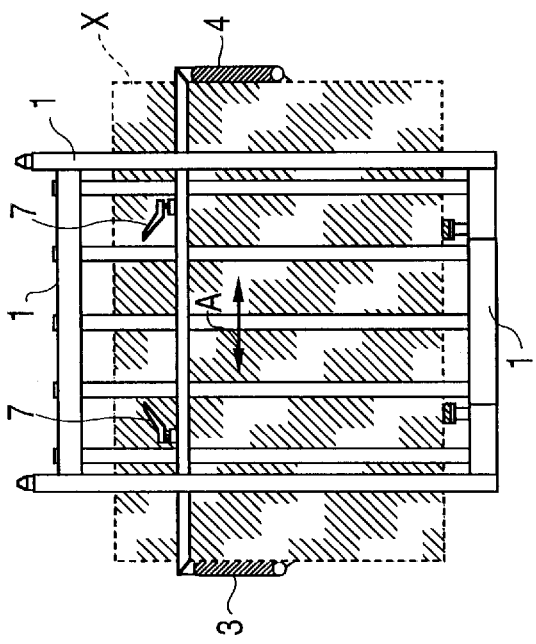
FIG. 2C shows the second preferred embodiment of the load security system according to the invention of FIG. 2A in the loaded state in a view from the rear side of the transport framework.
Figure 2B:
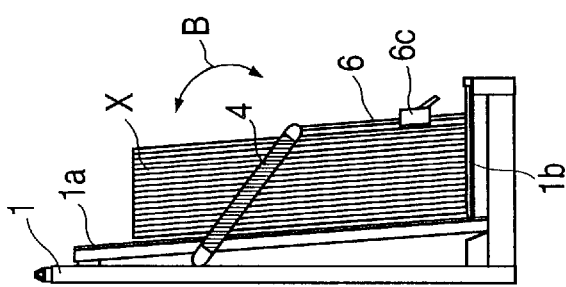
FIG. 2B shows the second preferred embodiment of the load security system according to the invention of FIG. 2A in the loaded state in a view from the side.
Figure 2A:
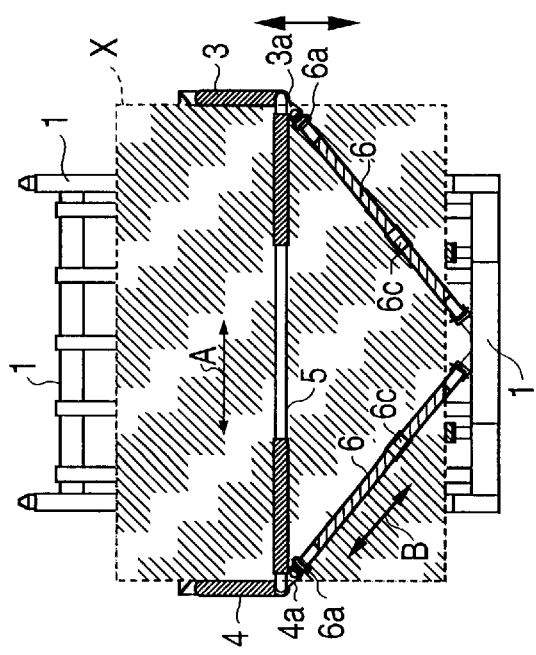
FIG. 2A shows a second preferred embodiment of a load security system according to the invention in the loaded state in a view from the front.
Figure 2G:
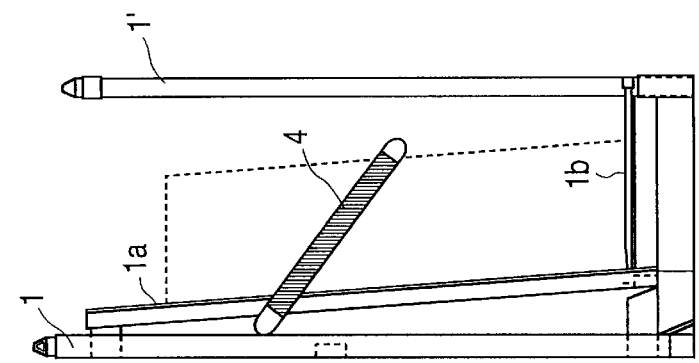
FIG. 2G shows the second preferred embodiment of the load security system according to the invention of FIG. 2A in the empty state in a view from the side.
Figure 2E:
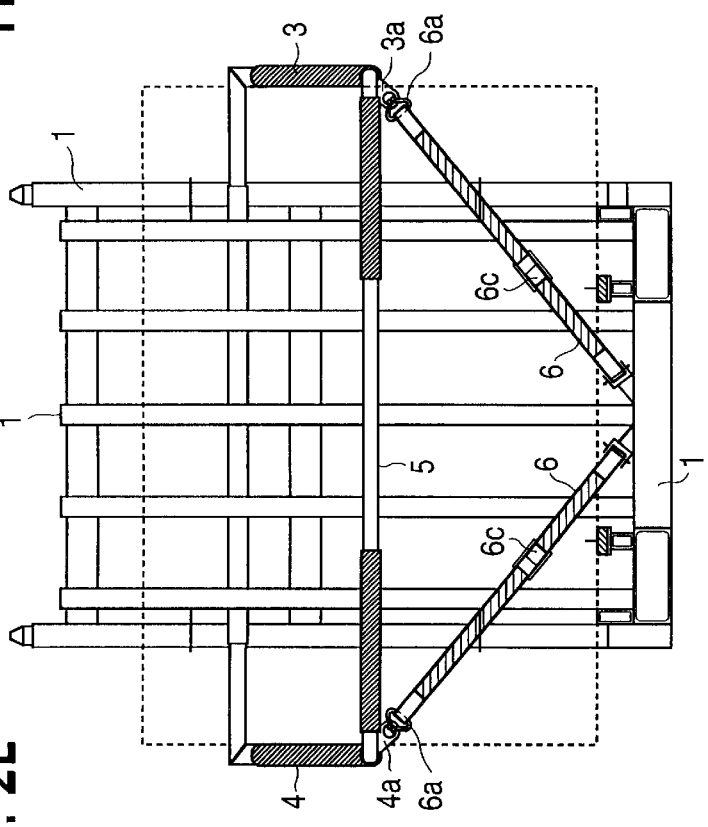
FIG. 2E shows the second preferred embodiment of the load security system according to the invention of FIG. 2A in the empty state in a view from the front.

With reference to FIGS 2A, 2D and 2E, the flexible lashing devices 6 each comprise a hook element 6*a* for hooking into respective eyes 3*a*, 4*a* on the front corner points of the swinging U-frame elements 3, 4, through which rapid fixing and rapid release of the swinging U-frame elements 3, 4 is possible. To this end, the flexible lashing devices 6 also comprise regions of strip-form elastic material 6*b*, adjusting devices 6*c* for the band length, which can be fixed, and retaining elements 6*d*, with which they are fixed to the storage and transport framework 1. The attachment to the storage and transport framework 1 is effected in a special diagonal arrangement relative to the side edges of the two-dimensional articles X, which allows the flexible lashing devices 6 to apply pressure to the surface of the two-dimensional articles X for pressing them flat against the frame part 1*a* of the storage and transport framework 1, which is symbolised by the arrow B in FIGS. 2A and 2B, and simultaneously to apply pressure to the side edges of the two-dimensional articles X for sideways pressing thereof on to the swinging U-frame elements 3, 4, so that sideways slipping of the load is prevented, which is symbolised by the arrow A in FIG. 2A. The securing of the load is effected after the swinging U-frame elements 3, 4 have been swung down and matched optimally to the load length and load depth, in that the hook elements 6*a* of the flexible lashing devices 6 are hooked into the eyes 3*a*, 4*a* of the swinging U-frame elements 3, 4. The applied pressure can then be regulated and set to the desired value by moving the adjusting devices 6*c* for the band length.

An additional possibility, through which the two-dimensional articles X can be gripped and retained between the swinging U-frame elements 3,4 is provided by the adjustable locking devices 7 on the rear side of the storage and transport framework 1, which are shown in FIG. 2C and means of which the swinging U-frame elements 3,4 can be fixed in various positions in the direction of their pivotal axis. This horizontal adjustability is indicated in FIG. 2C by the arrow A. Load lengths of the two-dimensional articles X can thus be preset and/or the load can be additionally secured horizontally.

The second embodiment is shown in the empty state in FIG. 2D in a view of the rear side of the transport framework. The enlarged representation serves above all to illustrate the elements of the flexible lashing device 6, whose construction and function have been described above.

Figure 2F:
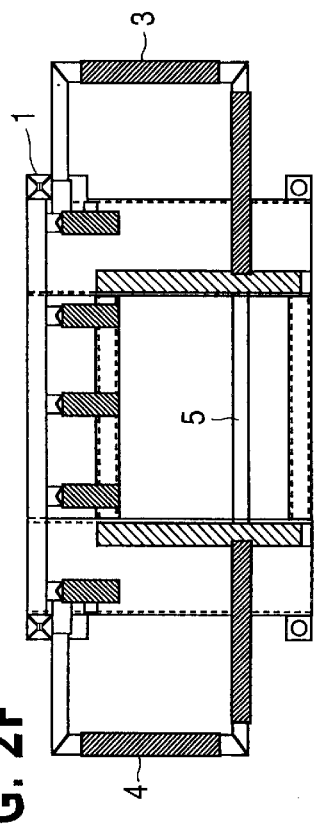
FIG. 2F shows the second preferred embodiment of the load security system according to the invention of FIG. 2A in the empty state in a view from above.
Figure 4C:
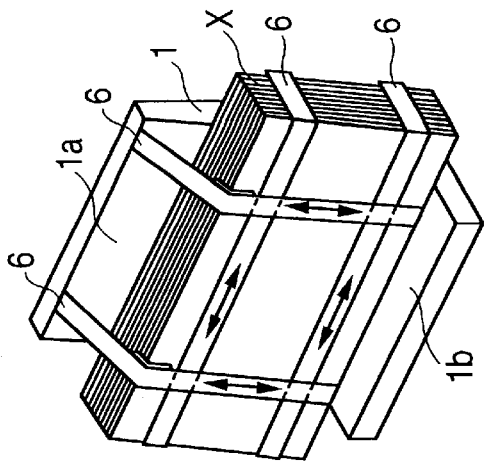
FIG. 4C shows a third load security possibility according to the state of the art through a strap securement in the loaded state in a perspective view.
Figure 4B:
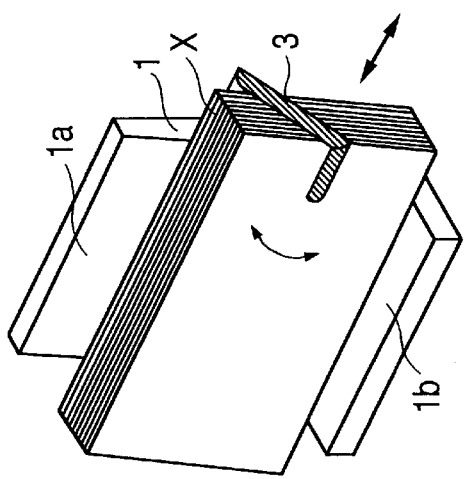
FIG. 4B shows a second known load security system according to the state of the art in the loaded state in a perspective view.
Figure 4A:
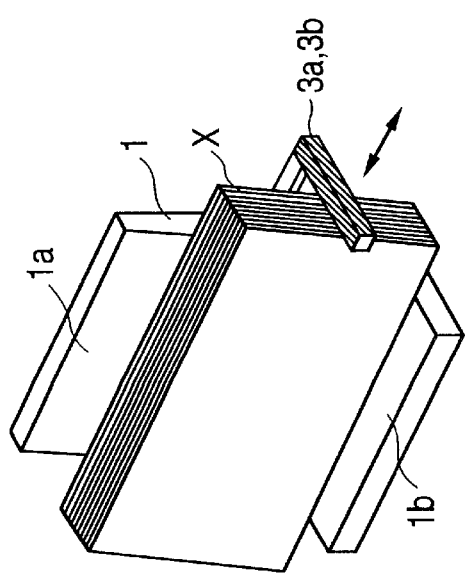
FIG. 4A shows a first known load security system according to the state of the art in the loaded state in a perspective view.

The second preferred embodiment is shown in FIG. 2E in the empty state in a view from the front side of the transport framework, wherein the symmetric matching to the load length is indicated by the broken lines. The view from above which is shown in FIG. 2F gives an impression of the relative spatial extents of the elements of the storage and transport framework 1 and the elements of the load security device, wherein the flexible lashing devices 6 are not visible. The view from the side in FIG. 2G indicates the tilt angle of about 4° for the canted position of the frame part 1a against which the two-dimensional articles X lean, which are again shown in broken lines. An additional element 1 which can be fitted to the front side of the transport framework is advantageous for further safety when transporting or positioning several storage and transport framework with the load security system according to the invention. The flexible lashing devices 6 are omitted here.

The described second embodiment is especially suitable for secure transport of glass plates and especially glass plate packs with side dimension of the glass plates up to some meters. The storage and transport framework and manufactured with side dimensions of about 1.80 m×1.80 m for example. However these dimensions do not impose any limitations either upwards or downwards, depending on the desired application.

FIGS. 3A to 3C relate to a third preferred embodiment of the load security system according to the invention, which is shown in FIGS. 3A and 3B in the loaded state. This third embodiment corresponds in construction and function essentially to the second embodiment, wherefore reference is made to the above explanations of the second embodiment. It is however enhanced by special abutment elements 8, which allow bowed two-dimensional articles Y to be stored or transported securely. As shown in FIGS. 3A to 3C abutment elements 8 mounted on universal joints are provided on the swinging U-frame elements 3, 4 and can slide on the swinging U-frame elements 3, 4 and can tilt in two dimensions and can in this way adapt to arbitrary surface shapes of curved two-dimensional articles Y.

The description only explains some possible embodiments of the present invention in detail. It is noted that other embodiments of the spring or pivoted elements, the tensioning devices, the locking devices or the abutment elements lie within the scope of the present invention, which is determined essentially by the following claims.

What is claimed is:

1. A load security system for a storage and transport framework for storing and/or transporting two-dimensional articles (X) each having a surface and, surrounding the side, an upper edge, a lower edge, and side edges extending between the upper edge and the lower edge, wherein the framework has at least one frame part against which the two-dimensional articles lean and at least one support supporting the lower edges of the two-dimensional articles, comprising a load security device having an abutment element adapted to engage one of the side edges of the two-dimensional articles, a spring or pivoted element in the vicinity of the opposite side edge of the two-dimensional articles (X), said spring or pivoted element being adapted to engage said opposite side edge of the two-dimensional articles, a tensioning device connected between said spring or pivoted element and the framework, the tensioning device applying tension to said spring or pivoted element to exert pressure on the surface of the two-dimensional articles (X) for flat pressure thereof on to the respective frame part of the storage and transport framework; and further characterized in that the tensioning device is so arranged between the storage and transport framework and the spring or pivoted element that the spring or pivoted element simultaneously exerts pressure on the side edge of the two-dimensional articles (X) in a direction toward the abutment element.

2. A load security system according to claim 1, characterized in that the spring or pivoted element is in the form of a pivoted swinging U-frame element.

3. A load security system according to claim 2, characterized in that the swinging U-frame element pivots about a horizontal axis.

4. A load security system according to claim 2, characterized in that the abutment element is formed as a horizontally movable swinging U-frame element pivoting about a horizontal axis, the pivoted swinging U-frame elements are connected together by a telescopic device, and in that there are two of the tensioning devices, each of the swinging U-frame elements being fixed to the front side of the storage and transport framework by a respective one of the tensioning devices.

5. A load security system according to claim 4, characterized in that the lashing devices are flexible.

6. A load security system according to claim 4, characterized in that abutment elements are mounted by universal joints on the swinging U-frame elements and are movable on the swinging U-frame elements and can tilt in two dimensions, and can in this manner adapt to arbitrary surface forms of curved two-dimensional articles (Y).

7. A load security system according to claim 4, characterized in that the load security system comprises adjustable stop devices, by means of which the swinging U-frame elements can be arrested in different positions in the direction of their pivotal axis.

8. A load security system according to claim 4, characterized in that the tensioning devices are formed as lashing devices.

9. A load security system according to claim 1, characterized in that the spring or pivoted element is horizontally movable.

10. A load security system according to claim 1, characterized in that the tensioning device is formed as a lashing device.

11. A load security system according to claim 10, characterized in that the lashing device is flexible.

12. In combination, a storage and transport framework for storing and/or transporting two-dimensional articles (X) each having a surface and, surrounding the surface, and upper edge, a lower edge, and side edges extending between the upper edge and the lower edge, and a load security system for the framework, wherein the framework has at least one frame part against which the two-dimensional articles lean and at least one support supporting the lower edges of the two-dimensional articles, comprising a load security device having an abutment element adapted to engage one of the side edges of the two dimensional articles, a spring or pivoted element in the vicinity of the opposite side edge of the two-dimensional articles (X), said spring or pivoted element being adapted to engage said opposite side edge of the two-dimensional articles, a tensioning device connected between said spring or pivoted element and the framework, the tensioning device applying tension to said spring or pivoted element to exert pressure on the surface of the two-dimensional articles (X) for flat pressure thereon on to the storage and transport framework; and further characterized in that the tensioning device is so arranged between the storage and transport framework and the spring or pivoted element that the spring or pivoted element simultaneously exerts pressure on said opposite side edge of the two dimensional articles (X) in a direction toward the abutment element.

13. The combination of claim 12, wherein the spring or pivoted element is mounted on the framework for movement horizontally relative to the framework.

14. The combination of claim 12, wherein the spring or pivoted element is a U-frame element pivotally mounted on said framework.

15. The combination of claim 14, wherein the U-frame element defines two generally parallel legs, one of said legs being journalled for pivoting on said framework.

16. The combination of claim 14, wherein the U-frame element is mounted for pivoting about a horizontal axis.

17. The combination of claim 12, wherein each of the U-frame elements is connected to a point on the framework spaced from the pivot mounting of the U-frame element.

18. The combination of claim 12, wherein the abutment element is a U-frame element mounted on the framework for pivoting about a horizontal axis, the spring or pivoted element is a U-frame element mounted on the framework for pivoting horizontally, and the two U-frame elements are connected by a telescopic device.

19. The combination of claim 18, further comprising abutment elements mounted by universal joints on the U-frame elements, whereby the abutment elements mounted by universal joints are adaptable to arbitrary surface forms of curved two-dimensional articles.

20. The combination of claim 18, further comprising adjustable stop devices for arresting the U-frame elements in different positions of pivoting about their respective horizontal axes.

21. The combination of claim 12, wherein the tensioning device is a lashing device.

22. The combination of claim 21, wherein the lashing device is flexible.

* * * * *